Jan. 3, 1956 R. F. CHAPMAN 2,729,741

DIVERSITY RECEPTION SYSTEM

Filed Oct. 10, 1951

INVENTOR
RICHARD F. CHAPMAN
BY Percy P. Lantzy
ATTORNEY

United States Patent Office 2,729,741

Patented Jan. 3, 1956

2,729,741

DIVERSITY RECEPTION SYSTEM

Richard F. Chapman, Glendale, N. Y., assignor to International Telephone and Telegraph Corporation, a corporation of Maryland Application October 10, 1951, Serial No. 250,583

5 Claims. (Cl. 250—20)

Figure 1:
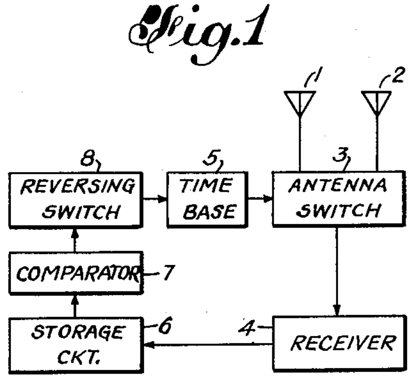

This invention relates to radio signal reception systems and more particularly to diversity reception systems for reducing the effects of fading.

Diversity systems for receiving signals at a plurality of points have been used in the prior art to overcome or reduce the troublesome effect of fading. The effects of fading may be observed at any instance by comparing the signal strength received on two antennas located at spaced points. For example, signals received at one antenna will be of maximum intensity, while signals received at the other antenna are of minimum intensity. Diversity may be obtained by use of several frequencies, polarizations, or suitably spaced and oriented antennas. In the conventional method of diversity reception, the output of each antenna is supplied to a separate receiver and then the outputs of all receivers are combined. This common method requires the use of a receiver for each receiving point. The combining of the signals from the several receivers results in diminishing the strength of the strongest signal and results in only an average signal strength. In addition, the combining of the signals for a plurality of receiving points creates the difficulty of proper phasing.

One of the objects of this invention, therefore is to provide a diversity reception system which overcomes the aforementioned objections.

Another object of this invention is to provide a diversity reception system using only one receiver.

A further object of this invention is to provide a diversity reception system having its receiver operatively connected only to the receiving point having the greatest signal strength.

Still a further object of this invention is to provide a system for the periodic comparison of two radio signals whereby the output will be, for the greatest portion of the time, the input signal having the greatest strength.

Briefly, in this invention a single receiver is employed throughout for a dual antenna diversity system. The single receiver is selectively connected during most of the time to the receiving antenna supplying the strongest signal. The receiver input is periodically switched over to the idle antenna for a relatively brief sampling interval to ascertain whether the signal in this idle antenna is still inferior in signal strength to the signal in the operative antenna or if it meanwhile has increased so as to exceed the signal strength in the operative antenna. If it is still inferior, the same duty cycle is maintained. If the signal in the idle antenna is now stronger than the signal in the operative antenna, the duty cycle is reversed, i. e., the heretofore idle antenna now becomes the operative antenna, to which the receiver is connected to most of the time, while the formerly operative antenna now becomes idle except for brief periodic sampling intervals.

Figure 2:
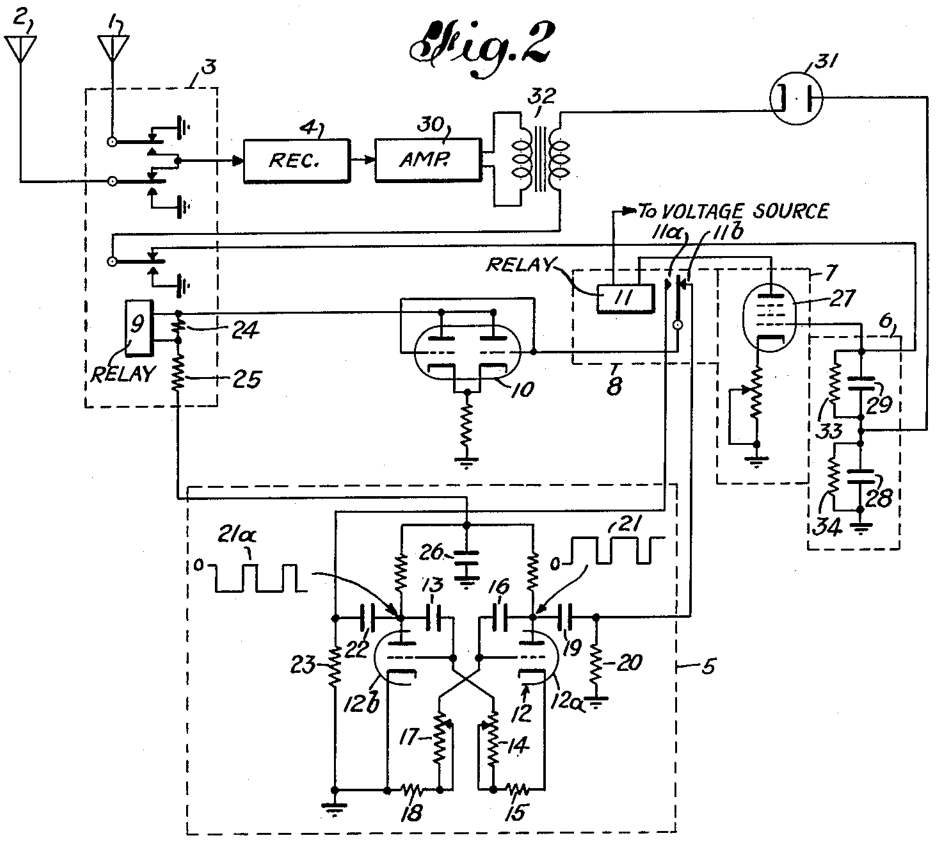

The above-mentioned and other features and objects of this invention and the manner of attaining them will become more apparent by reference to the following description taken in conjunction with the accompanying drawings, wherein:

Fig. 1 is a schematic illustration in block form of one embodiment of this invention; and Fig. 2 is a schematic diagram partly in block form showing the embodiment in more detail.

Referring to Fig. 1 of the drawing, for purposes of explaining the operation of this system, assume antenna 1 is idle and antenna 2 is connected through the antenna switch 3 to receiver 4. The time base circuit 5 determines the operation cycle of the antenna switch 3. The operation cycle is composed of two unequal periods. During the long period antenna 2 is connected to the receiver 4, and a voltage proportional to the output of antenna 2 is stored in the storage circuit 6. When the time base circuit 5 signals the beginning of the short period, it activates the antenna switch 3 so that the heretofore idle antenna 1 is now coupled to the receiver 4 for a relatively short time. The output from receiver 4 due to antenna 1 is fed to the storage circuit 6. The storage circuit 6 feeds a voltage proportional to the output of antenna 1 and the voltage proportional to the output of antenna 2, which was previously stored, to the comparator 7. The difference of the two input voltages at the comparator 7 is fed to the reversing switch 8. If the output of the comparator 7 indicates that the sampled antenna 1 now has a greater signal strength than the operative antenna 2, the reversing switch 8 is activated to reverse the roles of the two antennas, and antenna 1 now becomes the operative antenna and antenna 2 the idle antenna. This cyclic sampling is continuous.

Referring to Fig. 2 wherein the schematic diagram of the invention is illustrated in more detail, it is shown that antenna 1 and antenna 2 are connected to receiver 4 through antenna switch 3. When the relay 9 is in its de-energized position as shown, antenna 2 is coupled to the receiver and antenna 1 is grounded. The antenna switch relay 9 is activated by the electron tube 10 whose plate circuit is turned on and off by an unsymmetrical square wave voltage applied to the grid. This driving voltage is derived from the time base circuit 5 which, as shown, comprises a multivibrator, through the reversing switch 8. The multivibrator 5 is composed of electron tube 12 and the associated circuits. Cacapitor 13, resistance 14, and resistance 15 make up the long time constant of the long period of the operating cycle with resistor 14 providing an adjustable period. Capacitor 16, resistor 17, and resistor 18 form a sort time constant with resistor 17 providing an adjustment of this period. The plate pulses of electron tube 12 are not perfect square waves but are adequate for this purpose. Capacitor 19 and resistor 20, together with the grid cathode portion of electron tube 10, serves as a diode to form a D. C. restorer circuit. The grid of tube 10 is driven positive with respect to the cathode but only a fraction of a volt while capacitor 19 is being charged. As capacitor 19 discharges slowly, a high negative voltage is developed across resistor 20 so that tube 10 is kept cut off for the desired interval. During the positive portion of the square wave 21, tube 10 conducts since its grid is driven slightly positive. During the negative part of the square wave 21, tube 10 is cut off due to the high negative voltage across resistor 20. Therefore, the antenna switch relay 9 is energized when tube 10 conducts and de-energized when tube 10 is cut off. Capacitor 22 and resistor 23 serve the same function as capacitor 19 and resistor 20 when the reversing switch 11 is in its energized position and tube 10 will conduct only during the positive portion of wave 21*a*. Resistor 24 is necessary as a damping resistor for antenna switch 3 since current cutoff is very rapid, thus causing a high induced voltage in the relay coils. Resistor 25 and capacitor 26 form a decoupling filter which minimizes feedback of pulses due to the timing multivibrator 5 through the power supply to other circuits. Under certain conditions such pulses could interfere with the proper operation of this invention. Comparison of voltages due to antenna 1 and antenna 2 is accomplished at the grid of tube 27. Capacitor 28 is charged to a potential proportional to the output of antenna 1 during the portion of the timing cycle that relay 9 is energized, while the voltage on capacitor 29 is proportional to the output of antenna 2 during the portion of the timing cycle that relay 9 is de-energized. The grid-to-ground voltage of tube 27 is the sum of the two storage capacitor voltages, and its polarity is determined by the larger voltage. This addition of voltages constitutes the comparison process. If capacitor 28 has the higher voltage, the resultant grid potential is negative, thus decreasing the plate current of tube 27 which causes the closing of contact 11*a* on reversing switch 8. The half 12*b* of vacuum tube 12 then supplies the keying pulse as shown in curve 21*a* for antenna switch 3, making antenna 1 the operating antenna and antenna 2 the sampled antenna. If antenna 2 supplies the greater voltage, the sum of the two capacitor voltages will be positive, thus increasing the plate current of tube 27 causing contact 11*b* on reversing switch 8 to close. Then the half 12*a* of tube 12 will supply the keying pulse as shown in curve 21 making antenna 2 the operating antenna and antenna 1 the sampled antenna. Part of the output of receiver 4 is fed to amplifier 30 and is fed to diode 31 which serves as a half-wave rectifier with the secondary winding of transformer 32. Resistors 33 and 34 are grid leak resistors and at the same time discharge condensers 28 and 29 so that the new storage capacitor voltage levels can be established for a comparison relationship between the two antenna outputs. The time constant of the resistor-capacitor combination is, however, long enough to maintain an approximately constant D. C. voltage on either capacitor during the sampling period for satisfactory comparison of the voltages. An operative period of approximately three seconds and a sampling period of approximately 0.3 second are the optimum values. With a shorter sampling period there is not enough time for D. C. voltage buildup on storage capacitors 28 and 29. A longer sampling time permits too great a drop in potential during the sampling period on that capacitor which is storing voltage from the operating antenna. The net result is that there is a loss in comparator sensitivity for other than an 0.3 sampling period. However, this time setting is not critical, and a plus or minus 10 per cent difference in time can be tolerated.

While I have described above the principles of my invention in connection with specific apparatus, it is to be clearly understood that this description is made by way of example only and not as a limitation to the scope of my invention as set forth in the objects thereof and in the accompanying claims.

I claim:

1. A diversity reception system comprising two receiving antennas, a receiver, means to generate a timing cycle signal wave having two unequal portions, means for coupling said receiving antennas to said receiver alternately in response to said unequal portions of said timing cycle signal wave, means for comparing with each other the outputs of said receiver due to each of said antennas during the unequal portions of said timing cycle signal wave, and switching means responsive to the output of said comparison means to couple the receiving antenna responsible for the greater output coupled to the receiver during the longer of the unequal portions of the timing cycle signal wave.

2. A system according to claim 1 wherein said means for comparing with each other the outputs of said receiver due to each of said antennas during the timing cycle signal wave includes means to compare the peak voltage of the signals received at the two receiving antennas and means to generate a voltage indicative of which of the receiving antennas has the greater signal strength.

3. A system according to claim 2 wherein said means to compare the peak voltage of the signals received at the two receiving antennas includes a storage circuit comprising two capacitors each storing the signal received at one of said receiving antennas, said capacitors connected in opposition whereby the polarity of the output of said storage circuitry is indicative of which of the two receiving antennas provides the greater peak voltage output, an electron tube rendered conductive when the output of said storage circuit is of a predetermined polarity and maintained non-conductive when the output of said storage circuit is of a polarity opposite from said predetermined polarity and means to cause said switching means to be responsive to the conduction of said tube.

4. A system according to claim 1 wherein said means to generate a timing cycle includes a multivibrator having a portion of its cycle of relatively long duration and the remaining portion of its cycle of relatively short duration.

5. A diversity reception system comprising two receiving antennas, a receiver, means to generate a timing cycle signal wave having two unequal portions including a multivibrator having a portion of its cycle of longer duration than the other portion of its cycle, means for coupling said receiving antennas alternately to said receiver in response to said unequal portion of said timing cycle signal wave, means for comparing the output of said receiver during said unequal portions of said timing cycle signal wave and switching means responsive to said comparison means to couple the receiving antenna responsible for the greater signal output coupled to the receiver during the longer of the unequal portions of said timing cycle signal wave including a reversing switch to reverse polarity of the two portions of said timing cycle signal wave and means responsive to the greater signal strength at the two receiving antennas to control said reversing switch whereby the receiving antenna having the greater signal strength is coupled to the receiver for the greater portion of the timing cycle.

References Cited in the file of this patent

UNITED STATES PATENTS

| | | |
|---|---|---|
| 1,917,291 | Beverage et al. | July 11, 1933 |
| 1,930,868 | Willoughby | Oct. 17, 1933 |
| 2,059,081 | Beers | Oct. 27, 1936 |
| 2,189,317 | Koch | Feb. 6, 1940 |
| 2,243,118 | Peterson | May 27, 1941 |